Aug. 13, 1968
A. STOY ETAL
3,397,262
METHOD FOR CONTINUOUS POLYMERIZATION AND COPOLYMERIZATION
OF ACRYLONITRILE IN CONCENTRATED AQUEOUS
INORGANIC SALT SOLUTIONS
Original Filed Feb. 16, 1961
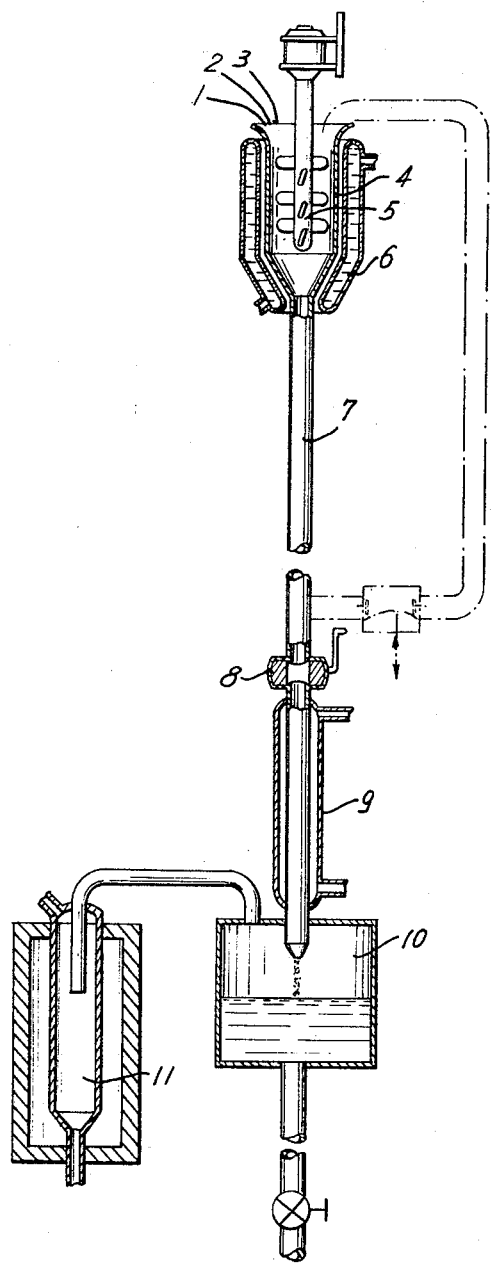

3,397,262
METHOD FOR CONTINUOUS POLYMERIZATION AND COPOLYMERIZATION OF ACRYLONITRILE IN CONCENTRATED AQUEOUS INORGANIC SALT SOLUTIONS
Artur Stoy and Vladimír Stoy, both of 7 Farní, Prague 6, Czechoslovakia
Continuation of application Ser. No. 549,372, May 11, 1966, which is a continuation of application Ser. No. 89,700, Feb. 16, 1961. This application Aug. 22, 1967, Ser. No. 662,544
Claims priority, application Czechoslovakia, Feb. 16, 1960, 1,018/60
9 Claims. (Cl. 264—182)

ABSTRACT OF THE DISCLOSURE

Continuous process for polymerizing or copolymerizing acrylic monomers, especially acrylonitrile, in aqueous mixtures containing zinc, magnesium and calcium chlorides. Solubility of the polymer in the salt solution allows polymerization, deaeration, and spinning into fibers in a single continuous process.

---

This application is a continuation of application 549,372, filed May 11, 1966 and now abandoned, which is a continuation of application 89,700, filed Feb. 16, 1961, also now abandoned.

It is known that acrylonitrile may be polymerized or copolymerized directly in aqueous concentrated salt solutions, particularly in that of zinc chloride which can be partially replaced by calcium or magnesium chloride or by other highly soluble salts. Viscous polymer solutions are thereby obtained which may be spun into aqueous coagulating baths. This method, however, is used in industrial scale with alkali metal rhodanides only, the zinc chloride containing solutions being of such a nature that the fibres obtained therefrom were unsuitable for usual textile purposes. Thus, if zinc chloride is to be used as solvent, acrylonitrile is polymerized or copolymerized in usual manner in diluted aqueous solution, the precipitated polymer is filtered off, washed, dried, comminuted and dissolved in a brine, consisting, e.g., of highly concentrated zinc and calcium chloride aqueous solution. The polymer solution thus obtained is then deaerated, filtered and spun into an aqueous spinning bath. The coagulating power of the spinning bath is usually reduced either by cooling it under 10° C. or by maintaining elevated salt concentration therein.

It is evident that such process of preparing spinning solutions is laborious and time consuming. On the other hand, rhodanides are more expensive and their recuperation from waste liquors is rather difficult; moreover, poisonous exhalations are evolved during the recuperation process. It is thus highly desirable to find a method for utilizing zinc chloride alone or mixed with other salts in a process of direct polymerization or copolymerization of acrylonitrile in order to obtain spinnable acrylic polymer solutions for high quality fibre production.

It has been found, according to the present invention, that said poor quality of polymers obtained by direct polymerization or copolymerization of acrylonitrile in highly concentrated aqueous zinc chloride solutions is caused by excessive branching of the polymers formed. In this case, the solvent does not undergo the chain transfer in any way. As a result very long polymer chains are formed and the chain transfer to monomer and polymer appears markedly on the foreground.

Chain transfer to the monomer and polymer is the cause of the branching since free radicals are formed on the monomer and polymer molecules. Moreover the branching increases the polydispersity so that the differential distribution curves are very broad. Generally the excessive branching reduces fibreforming properties of the polymer.

It has been found furthermore that said branching can be reduced by all measures decreasing the probability of chain transfer onto monomer and polymer. One of said measures is intentional reduction of initiator and promotor concentration, i.e., concentration of free radicals. Initiator is any compound capable of forming free radicals under given conditions, promotor is any heavy metal compound catalytically increasing the rate of splitting initiator molecules to free radicals. This measure, however, causes extraordinary rising of the average polymerization degree and thus the viscosity of the polymer solution.

Another measure is lowering the polymerization temperature. Thereby the concentration of free radicals is decreased too, but simultaneously the chain transfer onto the polymer is reduced since the energy of activation of the transfer reaction is greater than that of the polymerization. The polymers obtained at lower temperatures are more linear, but their degree of polymerization and viscosity are very high. Moreover the chain transfer onto the monomer is comparatively less affected by low temperatures.

It is also possible to add "regulators" or "modifiers" of polymerization, i.e., compounds undergoing much more easily the transfer reactions than the monomer and polymer. Such compounds are, e.g., aldehydes, esters of thioglycolic acid and other soluble compounds with hydrogen or halogen atoms which may be easily split off. Many of them, however, lower the polymerization rate and make the low temperature polymerization impracticable.

It is possible to obtain comparatively good results when combining all said measures, but the polymer properties are often so different that batch polymerizations are almost irreproducible. Best results are obtained with lower initial monomer concentrations, but it is highly desirable to gain as concentrated spinning solutions as possible.

An object of the present invention is a method for continual polymerization and copolymerization of acrylonitrile using all said measures for the reduction of excessive branching in a combination, such combination giving very linear polymers with an unusually narrow polydispersity.

It has been found, however, that it is not sufficient to use the common continual polymerization method in which a mixture of monomeric material with solvent, initiator etc. is simply passed through a zone maintained at the polymerization temperature. According to the present invention the continual polymerization is to be carried out in such a way that the monomer concentration is very low in any stage of the reaction, even at the beginning. This can be achieved so that a solution of monomeric material is stirred continually into an excessive amount of polymer solution. The solvent is an aqueous highly concentrated solution of inorganic salts, particularly that of zinc chloride, mixed, if desired, with calcium chloride or other highly soluble salts. Intiator, promotor, regulator are dissolved in the same solvent and added simultaneously with the monomer solution in such a way that the concentration thereof remains constant. The polymerizing mixture is effectively cooled in order to reduce the chain transfer onto the polymer, the increase of the polymer concentration during the process being unavoidable. On the other hand, the chain transfer onto the monomer, which cannot be substantially affected by cooling, is removed by steady low monomer concentration.

Only in this way the excessive branching can be excluded almost entirely.

In a batch polymerization the concentration of the monomer decreases and that of the polymer increases. Simultaneously the free radical concentration varies in a rather uncontrollable way, rising steeply with any rising of temperature and decreasing with the consumption of the initiator. It has been established that the average molecular weight of the polymer varies during the polymerization even if the transfer onto polymer is removed by using temperatures under zero.

In accordance therewith, if samples of a polymerizing solution are taken away, the polymerization of the samples is rapidly interrupted, the polymer isolated and its viscosity in a diluted dimethylformamide solution measured, it can be observed that the average polymerization degree rises very steeply in the first half-period, then decreases also steeply to about the original value and finally remains constant or increases very slowly again. This phenomenon appears clearly in an "adiabatic" arrangement, when the polymerization is carried out in an insulated flask without cooling, and also in an "isothermal" arrangement, where the polymerizing solution is distributed into several little flasks immersed into a cooling mixture (e.g., a mixture of ice with kitchen salt), the flasks being removed and their contents poured into an aqueous inhibitor solution in regular time intervals. Thereafter the polymer is washed, dried, comminuted and dissolved and its viscosity is measured in usual manner.

Several series of such experiments have shown that the peaks on the molecular weight, plotted against the time of polymerization, depend primarily upon the monomer concentration. They can be lowered further by "regulators." The analysis has further shown that said peaks are rather independent of the temperature, which however, affects very sharply the average molecular weight, influencing the free radical concentration. The slow increase of the molecular weight at the end of the polymerization in the "adiabatic" arrangement mentioned above is caused by the chain transfer onto the polymer. This kind of transfer is positively influenced by increased temperature, but it has not such a marked effect on the average molecular weight as the transfer onto the monomer.

Thus the continual polymerization according to the invention is carried out with a constant low monomer concentration in order to decrease or exclude the transfer onto the monomer, and at low temperatures between —25 and +40° C. in order to slow down the chain transfer onto the polymer. Said effects are enhanced by adding "regulators" or "modifiers" of the kind mentioned above.

The monomer concentration is to be kept under 10 volume percent and advantageously under 5 volume percent. This may be achieved, e.g., so that the top of the polymerization apparatus is broadened so that it contains a rather great volume of the polymerizing solution. The fresh monomer solution together with the initiator etc. is rapidly stirred into the solution in the broadened end of the apparatus in such a rate that the monomer concentration cannot exceed the above stated value. The polymerized solution is withdrawn in the same rate so that the level at the top of he reactor remains constant. The level may be easily controlled automatically by means of a valve.

The size of the broadened top end of the reactor is limited by the necessity of effectively dissipating the polymerization heat by cooling in order to maintain the temperature constant. It is, however, possible to recycle the fully polymerized, cool solution partially so as to increase the polymer:monomer ratio. In this way the broadness of the top end can be kept at appropriate value and the cooling is unloaded. The recycled polymer solution contains no initiator and almost no monomer so that the polymerization is not affected unfavorably.

The resulting polymer solution is deaerated by evacuation in the same continuous process, whereat the vacuum is used simultaneously for transporting the highly viscous solution through the rather long polymerization apparatus. The length of the apparatus must be great enough in order to secure as complete polymerization as possible together with maximum output of the spinning solution. In greater apparati the gravitation can be utilized for the transport of the polymer solution. Besides the transport may be aided by a stirring device, the bottom blades of which are suitably inclined. In this way any pump may be saved, except the greatest reactors.

From the evacuated vapors the rest of the unpolymerized monomer and the unconsumed part of the regulator may be caught in a cooled trap or in a cooled column filled with active charcoal or with silica gel. Thus the ready made deaerated spinning solution is prepared in a single operation together with the monomer and regulator regeneration.

The cooling may be carried out by means of a cooling brine, comminuted ice with water, cooled water or by any other suitable means. In any case the temperature is to be kept strictly constant if the best results are to be obtained.

Any initiator capable of forming free radicals at the given temperature may be used. Redox systems promoted with iron or copper salts proved best. As oxidizing component, e.g., following compounds are appropriate: Ammonium or potassium persulfate, hydrogen peroxide, salts and esters of different peroxidic acids, such as perboric, percarbonic, peracetic acid, etc. Different organic peroxides are also suitable, such as methylethyl ketone hydroperoxide, peroxides of different monomers, particularly acrylonitrile peroxide, peroxides and hydroperoxides of cyclic and aliphatic ketones, ethers and the like. As reducing component, e.g., following compounds may be used: Pyrosulfites of alkaline metals, hydrosulfites, thiosulfates, bisulfites, aldehyde-bisulfites, organic sulfinic acids, ascorbic acid, reducing sugars, secondary and tertiary amines such as diethyl aniline, etc. The initiator system, the promotor concentration and the temperature are chosen so as to maintain the free radical concentration on an appropriate level during the whole process, i.e., until the monomer is substantially exhausted.

If zinc chloride solution is used as solvent, the components of the redox initiator are dissolved in the same solvent and added separately. Promotor, e.g., copper dichloride dihydrate, may be added to the reductive component of the initiator. Acrylonitrile, when stored under access of air, contains always some peroxide. Thus care must be taken not to add any reductive compound to the stored solution, especially if copper or iron promotor is present therein. If, e.g., an aldehyde is added to the monomer solution as regulator, and copper salt as promotor, the monomer solution must be kept cool and consumed as soon as possible in order to prevent spontaneous polymerization.

The method according to the invention is illustrated by following examples in connection with the annexed drawing.

EXAMPLE 1

The polymerization was carried out in a laboratory apparatus shown in FIG. 1. Three solutions A, B and C were metered through inlets 1, 2 and 3.

*Solution A*

| | Volume parts |
|---|---|
| Aqueous $ZnCl_2$ solution, $d=1.96$ | 165 |
| Aqueous $CaCl_2$ solution, $d=1.43$ | 200 |
| Acrylonitrile | 120 |
| Butyraldehyde | 2 |

The solution was cooled to —5° C.

*Solution B*

| | Volume parts |
|---|---|
| 1.33% solution of potassium pyrosulfite in zinc chloride solution, $d=1.85$ | 15 |
| 0.1% aqueous copper dichloride dihydrate solution | 2 |

Solution C

| | Volume parts |
|---|---|
| 1.00% ammonium persulfate solution in a zinc chloride solution, $d=1.85$ | 20 |

The metering is adjusted so that all three solutions are added during 8 hours through the inlets 1, 2, 3. The stainless steel reactor 4 is provided with a stirrer 5, running at 100 r.p.m., and immersed into cooling water (5° C.) circulating in the glass jacket 6. The polymerization is finished in the tube 7. The valve 8 is controlled in dependence upon the level in the reactor 4 so that said level is kept constant. The flowing solution is deaerated in the jacketed tube 9 heated to 65° C. and collected in the flask 10, heated moderately in order to prevent vapors (monomer, butyraldehyde and water) to be condensed on the walls. The vapors are then condensed in the trap 11 cooled to −78° C. by means of Dry Ice and ethanol. The trap is connected with a vacuum pump (20 mm. Hg), not shown. The collected solution may be spun immediately. The average molecular weight of the polymer is about 650,000. The differential distribution curve, obtained by fractionation from a diluted solution of the isolated polymer in dimethylformamide, is very narrow with a sharp, high peak.

EXAMPLE 2

The three solutions had following composition:

Solution A

| | Volume parts |
|---|---|
| Aqueous zinc chloride solution, $d=2.00$ | 400 |
| Aqueous calcium chloride solution, $d=1.41$ | 500 |
| Acrylonitrile | 380 |
| Butyraldehyde | 20 |
| Ethylene glycol | 20 |

Solution B

| | Volume parts |
|---|---|
| Aqueous zinc chloride solution, $d=1.80$, containing 5 percent (weight) potassium pyrosulfite and 0.74% $CuCl_2 \cdot 2H_2O$ solution, 0.1% | 150 |

Solution C

| | Volume parts |
|---|---|
| 5% ammonium persulfate solution in aqueous zinc chloride solution, $d=1.80$ | 150 |

The three solutions were metered in the ratio 10:1:1 into an apparatus similar to that shown in Example 1. The polymer had average molecular weight 440,000, excellent fiber forming properties and very narrow polydispersity.

EXAMPLE 3

The solutions A, B, C of the same composition as in Example 2, where only in solution A 10 percent of acrylonitrile is replaced by methyl methacrylate, are fed into a similar device as described in Example 1. The diameter of the reactor 4 is 10 cm. and a part of the polymer solutions is recycled from the tube 7 to the top of the reactor by means of a diaphragm pump. The reactor is cooled with a brine at −8° C.

If desired, the spinning solution may be continually or discontinually withdrawn from the flask or vessel 10, e.g., by a vertical tubing sufficiently high to surmount the atmospheric pressure by the weight of the solution column. If the density of the polymer solution is, e.g., 1.5, the minimum height of the vertical discharging tube is 6.7 m.

The arrangement with recycled part of the polymer solution is particularly advantageous if two monomers are used with different copolymerization parameters. It is also possible to recycle the condensate from the trap 11 in order to maintain the required ratio of the two monomers. It is more convenient, however, to add the balance of the more slowly copolymerizing monomer directly into the solution A.

The spinning solution obtained by the method described above may be spun by any appropriate way, e.g., through a spinneret provided with large orifices (0.4 to 3.0 mm.) over a short layer of a non-coagulating medium into an aqueous zinc and calcium chloride (15 to 30 percent) so as to obtain elastic filaments containing about 50 percent or more of said salts. The elastic filaments are then elongated to several hundred percent of their original length and thoroughly washed. Oriented homogeneous fibres are obtained. Continual polymerization according to the present invention can form the initial step, however, of any appropriate method of making acrylic fibres from concentrated inorganic salt solutions, where said solutions are spun into aqueous coagulating baths and then oriented by drawing at room or increased temperature.

It is also possible, without exceeding the scope of the invention, to lead undissolved monomeric material into the reactor together with initiator dissolved in concentrated salt solution, the monomeric material being dissolved directly in the reactor.

The design of the polymerization apparatus is not limited to that diagrammatically shown on the annexed drawing. It is possible, for instance, to add the monomeric material and/or initiator at any level of the mixing reactor, in one or in several streams. The stirrer can be internally cooled and its shaft can have an increased diameter so that the circular space between the shaft and the wall of the reactor is considerably narrowed. The recycling of the polymer solution can be replaced by an arrangement of a series of polymerization apparatuses with increasing size, so that all polymer solution produced by the first reactor is led into the second one, etc., further monomeric material, initiator components, regulator solutions being stirred into the polymer solution in each subsequent device.

The ratio of the monomer to the initiator can be varied too, and so the temperature, so that polymers of any desired molecular weight may be obtained. The stored solutions are preferably cooled down under zero in order to prevent premature polymerization and also an excessive accumulation of the reaction heat in the top part of the reactor. Since considerable heat is evolved by dissolving acrylonitrile in a concentrated zinc chloride solution, it is advantageous to dissolve the monomer previously and to cool down the solution prior to its entrance into the reactor.

Among advantages obtained by the process according to this invention the possibility of obtaining very viscous bubble-free solutions should be mentioned. The high viscosity is caused either by increased polymer concentration or by its high molecular weight or by the two reasons simultaneously; it adds to the economy and fibre quality.

We claim:

1. A process for preparing acrylic fibers, comprising continuously feeding a solution of acrylic monomers in a concentrated inorganic salt solution into an agitated polymerization zone being formed of a solution of the polymerization product of said acrylic monomers in a concentrated inorganic salt solution, said acrylic monomers being fed into said zone at such a rate that the monomer concentration in said zone is kept below 10% of the volume thereof, said zone being maintained at a temperature of between −25° C. and +40° C., thereby causing polymerization of said acrylic monomers to an acrylic polymer dissolved in said inorganic salt solution; continuously withdrawing a portion of the thus formed acrylic polymer solution from said zone; and spinning the withdrawn polymer solution to form fibers.

2. A process as defined in claim 1, wherein said acrylic monomer is selected from the group consisting of acrylonitrile and mixtures of acrylonitrile and methyl methacrylate.

3. A process as defined in claim 2, wherein said acrylic monomer is acrylonitrile.

4. A process as defined in claim 2, wherein said acrylic monomer is a mixture of at least 90% acrylonitrile and up to 10% methyl methacrylate.

5. A process as defined in claim 2, wherein the salt of said concentrated inorganic salt solution is selected from the group consisting of zinc chloride, magnesium chloride, calcium chloride and mixtures thereof.

6. A process as defined in claim 2, wherein the salt of said concentrated inorganic salt solution is selected from the group consisting of zinc chloride and mixtures of zinc chloride with at least one salt selected from the group consisting of magnesium chloride and calcium chloride.

7. A process as defined in claim 2, wherein said portion of the thus formed acrylic polymer solution is withdrawn from said zone in such a manner as to maintain the volume of said zone substantially constant, and including the step of subjecting said continuously withdrawn portion, prior to spinning of the same, to elevated temperature and a partial vacuum so as to deaerate said withdrawn portion and to withdraw vapors of unreacted monomer therefrom.

8. A process as defined in claim 7, wherein a portion of the deaerated and substantially monomer-free polymer solution is recycled into said polymerization zone.

9. A process as defined in claim 2, wherein the monomer concentration in said zone is kept below 5% of the volume thereof.

References Cited

UNITED STATES PATENTS

| | | | |
|---|---|---|---|
| 3,256,767 | 8/1944 | Kropa | 260—29.6 |
| 2,837,492 | 6/1958 | Stanton et al. | 260—29.6 |
| 2,963,457 | 12/1960 | Miller | 260—29.6 |
| 2,880,076 | 3/1959 | Kircher et al. | 260—23 |
| 2,883,272 | 4/1959 | Kirk | 260—23 |
| 2,425,192 | 8/1947 | Kropa | 260—29.6 |
| 2,777,832 | 1/1957 | Mallisson | 260—29.6 |

WILLIAM H. SHORT, *Primary Examiner.*

E. NIELSEN, *Assistant Examiner.*